No. 816,117. PATENTED MAR. 27, 1906.
O. A. NELSON.
SPLIT PULLEY.
APPLICATION FILED MAR. 28, 1905.
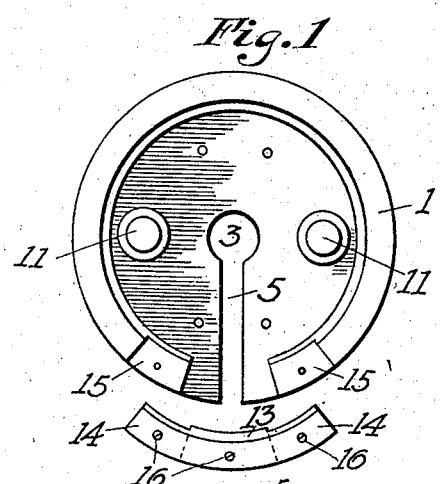
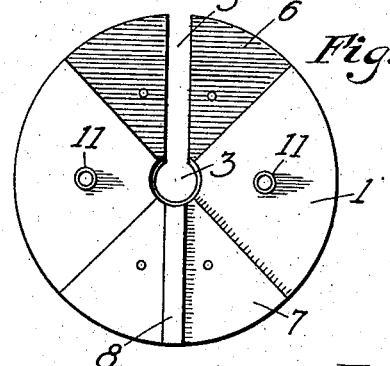
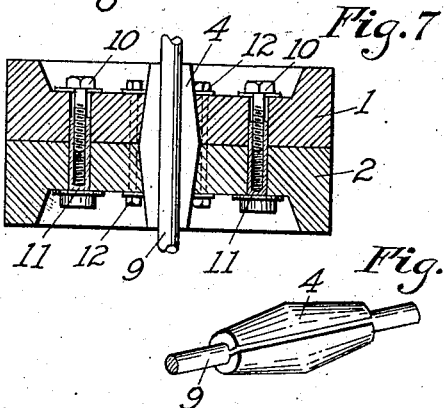
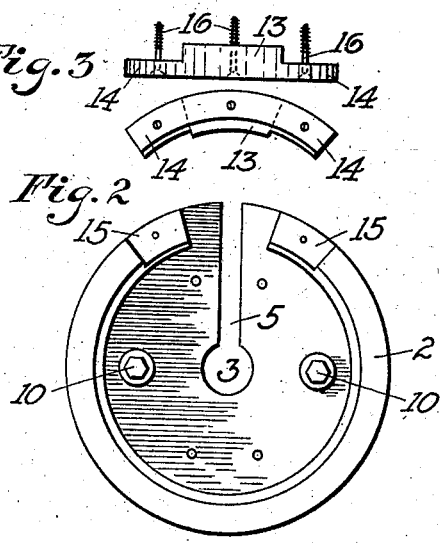
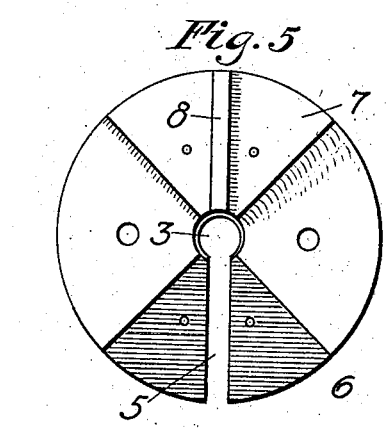
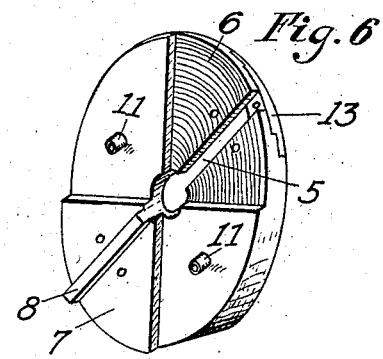
Witnesses
Wm. C. Allen
Rufus B. Clark
Inventor
Otto A. Nelson
By Attorney
Stephen A. Brooks

UNITED STATES PATENT OFFICE.

OTTO A. NELSON, OF BALLARD, WASHINGTON.

SPLIT PULLEY.

No. 816,117.  Specification of Letters Patent.  Patented March 27, 1906.

Application filed March 28, 1905. Serial No. 252,585.

*To all whom it may concern:*

Be it known that I, OTTO A. NELSON, a citizen of the United States, residing at Ballard, in the county of King and State of Washington, have invented certain new and useful Improvements in Split Pulleys, of which the following is a specification.

My invention relates to improvements in split pulleys; and the primary object thereof is to construct an improved pulley of this type of sections which can be slid onto the shaft from opposite sides thereof, said sections being so formed that they, when secured together, will be frictionally held onto a bushing mounted on the shaft.

A further object is to provide a comparatively simple and inexpensive construction embodying but few parts and which are not liable to be readily injured or become deranged.

Further, the invention consists in the parts, combination of parts, and the relative arrangement thereof, as set forth in the following description and particularly pointed out in the appended claims.

In the accompanying drawings, in which like numerals of reference indicate like parts throughout the several views, Figure 1 is a side view of one of the pulley-sections looking at the outer face thereof and showing the rim-section removed therefrom. Fig. 2 is a similar view of the other pulley-section with its rim-section removed. Fig. 3 is an edge view of the last-named removable rim-section. Figs. 4 and 5 are detail plan views looking at the inner faces of the pulley-sections. Fig. 6 is a view in perspective of one of the pulley-sections. Fig. 7 is a cross-sectional view of the pulley, and Fig. 8 is a detail view in perspective of the split bushing and the shaft on which it is mounted.

My improved pulley comprises two interlocking sections 1 and 2, formed with tapered central openings 3, adapted to receive the bushing 4, and each section is formed with a slot 5, which extends from the respective openings 3 to the edges of the sections. Each section is also formed with recesses 6 and projections 7, preferably of segmental form, and which are diametrically opposite each other, and the projection 7 of one section is adapted to fit snugly in the recess 6 of the other section, thereby preventing any tendency of one section slipping on the other when the pulley is being subjected to great strain. The projections 7 are formed with ribs, as 8, which project into and are snugly received in the respective slots 5 of the pulley-sections 1 and 2.

Mounted in the openings 3 of the respective pulley-sections is a bushing 4, and this bushing is tapered from its central portion to its opposite ends and is formed in longitudinal sections. (See Fig. 8.) Consequently when it is desired to mount the pulley on the shaft (indicated at 9) said sections can be readily arranged on the shaft after the pulley-sections 1 and 2 have been slid thereon from opposite sides and have one of their end portions forced into the central opening 3 of one of the pulley-sections. The other pulley-section can then be moved toward the first-named pulley-section and receive the other ends of the bushing-sections in its tapered central opening. Screw-bolts 10 are then tightened, the same having their inner ends threaded in sockets 11, and the two pulley-sections are thereby tightly drawn together, and the sections when moving toward each other obviously cause the respective bushing-sections to bind tightly on the shaft and are themselves tightly wedged onto the bushing-sections. After screw-bolts 10 have been operated and the pulley-sections 1 and 2 thereby held in locked position suitable additional securing-bolts, as 12, are passed through the sections to securely hold them together.

In order that the pulley-sections will not be materially weakened by the formation of slots 5 therein, I provide removable rim-sections 13, which fit over said slots, the same being arranged on the outer faces of the sections and having end wings, as 14, which are snugly received in recesses 15, formed in the rim on opposite sides of said slots 5. Suitable means, as screws 15, secure these sections in position, and the intermediate screw preferably passes through the adjacent opening 5 and is secured in the rib 8 when the same is fitted therein.

In the drawings I have shown a construction which comprises but few parts, and these can be readily assembled when it is desired to mount the pulley on a shaft.

Having thus described my invention, what I claim as new, and desire to secure by Letters Patent of the United States of America, is—

1. A split pulley formed of two sections having their inner faces provided with oppositely-disposed recesses and projecting portions, the recess of one section receiving the projecting portion of the other section, said sections being each formed with a central opening and a slot leading therefrom, there being ribs secured to said projecting portions and normally fitting in said slots.

2. A split pulley formed of two sections having their inner faces provided with recesses and projecting portions, the recess of one section receiving the projecting portion of the other section, said sections being each formed with a central opening and a slot leading therefrom, there being ribs secured to said sections and normally fitting in said slots.

In testimony whereof I affix my signature in presence of two witnesses.

OTTO A. NELSON.

Witnesses:
   GEORGE R. TENNANT,
   HOWARD D. HUGHES.